United States Patent [19]
Usui et al.

[11] Patent Number: 4,821,253
[45] Date of Patent: Apr. 11, 1989

[54] OPTICAL DISK AND OPTICAL DISK APPARATUS WITH ERROR CORRECTION

[75] Inventors: Makoto Usui, Suita; Katsumi Murai, Kyoto; Isao Satoh, Neyagawa, all of Japan

[73] Assignee: Matsushita Electric Industrial Co., Ltd., Osaka, Japan

[21] Appl. No.: 132,279

[22] Filed: Dec. 14, 1987

[30] Foreign Application Priority Data

Dec. 19, 1986 [JP] Japan ................................. 61-304274
Mar. 24, 1987 [JP] Japan ................................. 62-69315

[51] Int. Cl.⁴ ................................................ G11B 7/00
[52] U.S. Cl. ........................................ 369/54; 369/59; 360/53; 360/48
[58] Field of Search ..................... 369/30, 32, 33, 53, 369/54, 58, 59; 360/39, 40, 48, 53

[56] References Cited
U.S. PATENT DOCUMENTS
4,638,472 1/1987 Ogata et al. ........................... 369/54

Primary Examiner—Robert L. Richardson
Attorney, Agent, or Firm—Stevens, Davis, Miller & Mosher

[57] ABSTRACT

This invention relates to an optical disk, in which part of the sectors are reproduction-only sectors and remaining sectors are recording-reproduction sectors. Data and first error correcting codes for the data are recorded in advance in the reproduction-only sectors, and second error correcting codes for data over a plurality of reproduction-only sectors are recorded in advance in other reproduction-only sectors. At data reproduction, only sectors which are unrecoverable by the first error correction codes undergo error correction by the second error correcting codes, and the corrected data with the first error correcting codes being appended are recorded in the recording-reproduction sectors. Later on, when data in sectors unrecoverable by the first error correcting codes are needed, the above-mentioned recorded sectors are read out. Data storage about twice the capacity of the data recording areas is made possible by adopting the PWM (pulse width modulation) recording for the data reproduction-only area and the PPM (pulse position modulation) recording for the recording-reproduction area.

13 Claims, 5 Drawing Sheets

F I G. 1A
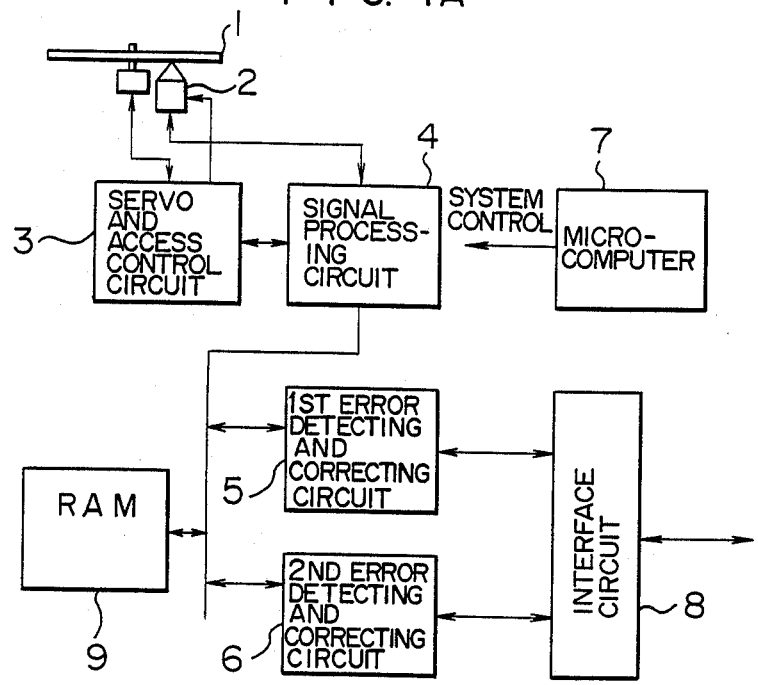
F I G. 1B
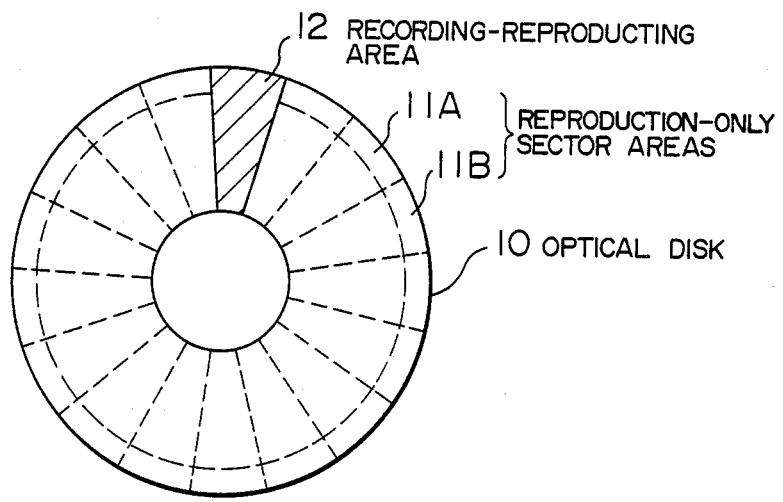

$$Q0 = D0,0 \oplus D0,1 \oplus D0,2 \oplus \text{---} \oplus D0,N-1$$
$$Q1 = D1,0 \oplus D1,1 \oplus D1,2 \oplus \text{---} \oplus D1,N-1$$
$$Q2 = D2,0 \oplus D2,1 \oplus D2,2 \oplus \text{---} \oplus D2,N-1$$
$$\vdots$$
$$Q511 = D511,0 \oplus D511,1 \oplus D511,2 \oplus \text{---} \oplus D511,N-1$$

with labels 30 and 31 above the first two terms of Q0.

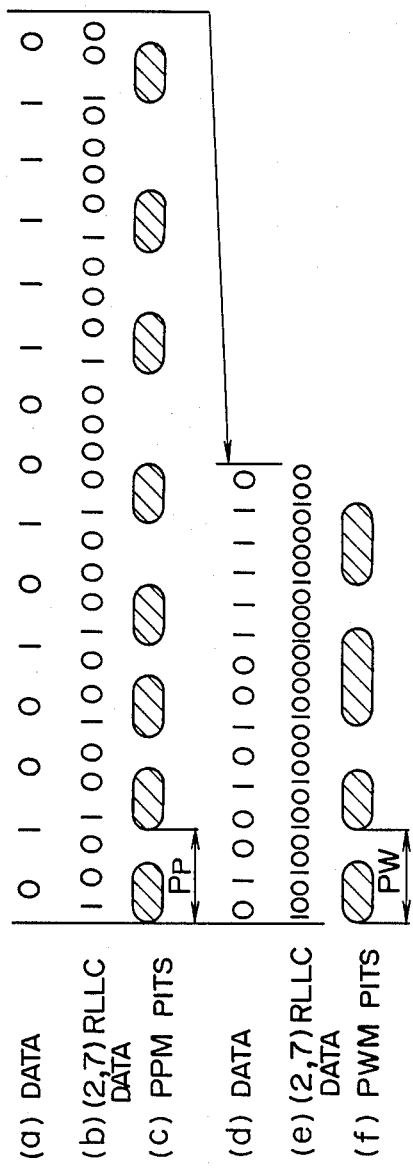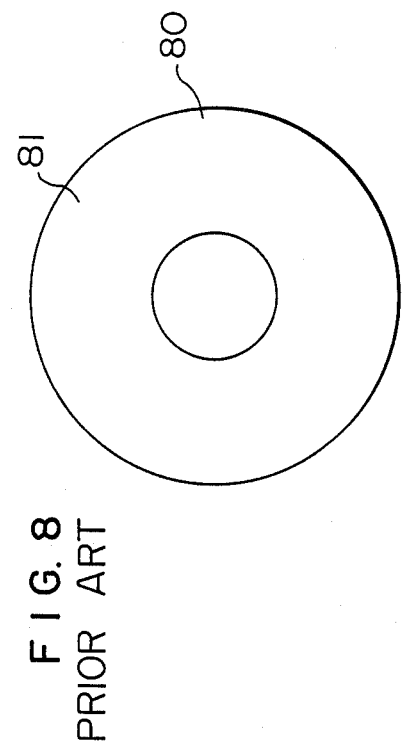
FIG. 8
PRIOR ART

OPTICAL DISK AND OPTICAL DISK APPARATUS WITH ERROR CORRECTION

BACKGROUND OF THE INVENTION

1. Field of the Invention

This invention relates to an optical disk, in which part of the sectors are reproduction-only sectors and remaining sectors are recording-reproduction sectors.

2. Description of the Related Art

For use as an external mass data memory, attention is paid to the reproduction-only optical disk in which data is recorded in the form of pits in submicron size on a plastic disc substrate, and the data is read out by the irradiation of a laser beam converged to a spot of about 1 μm.

The reproduction-only disk is manufactured in such processes of forming sub-micron sized pits modulated by data on the substrate of plastic resin such as polycarbonate with a thickness of 1.2 mm, a reflection layer, e.g., aluminum, is deposited on the resin surface, and a protective layer is applied to the entire surface. A disk with a 12 cm diameter has a storage capacity as much as 500–600 MB, but it does not allow recording of data. The reproduction-only disk will be used by exerting its properties including mass capacity, random access ability, easiness of mass production, and low cost. Examples of conceivable application are dictionaries of word processors, photo-pattern memories, and files of computer programs and instruction manuals.

However, as general characteristics, the optical disk has a high raw error rate as compared with a magnetic disk. On this account, both of data and the error detect-correcting codes are recorded in the process of manufacturing reproduction only disks, and errors of data are detected and corrected using the error detect-correcting codes in the data read-out operation.

An example of error correcting method for the conventional reproduction-only disk apparatus will be described with reference to the drawings.

FIG. 2 shows an example of the recording format. In FIG. 2, indicated by 20 are data, 21 are first error correcting codes, and 22 is the recording direction. Control codes such as a sync code and VFO are omitted in the figure. FIG. 8 is a diagram showing the conventional sector arrangement. In FIG. 8, indicated by 80 is an optical disk and 81 is a reproduction-only sector area.

In this prior example, the error detecting and correcting codes 21 are generated and appended to the data 20 in advance in the record on the optical disk 80. The disk is read out with an optical disk apparatus, and if error is detected in the data, data correction is implemented for the data 20 using the error correcting codes 21. Usually, optical disks are sectored for the sake of easy access.

However, the foregoing scheme necessitates a high-grade error correcting code appended to data so that uncorrectable sectors do not occur, resulting in a longer decoding time and a complex arrangement of the decoder and a reduced data storage capacity due to increased overhead for the code.

SUMMARY OF THE INVENTION

In view of the foregoing situation, the present invention has an object to provide an optical disk apparatus which allows the user to record data on the reproduction-only disk, provides a large-capacity reproduction-only area, and is operative in a short access time.

A crucial matter on the ability of the error correcting code for the optical disk is enormous burst errors caused mostly by dusts and defects of the recording medium, and errors occur mostly in specific sectors. Accordingly, a sector which has once read out and had the second error correction is highly possible to need second error correction again when it is accessed next.

Since the second error correcting codes are generated for many sectors, it is necessary for the second error correction to read out all necessary sectors for carrying out the first error correction, resulting in a longer access time. Therefore, data in reproduction-only sector which has been rendered second error correction even once is recorded, with a first error correcting code being appended, to a recording-reproduction sector.

This sector will no more need to have the second error correction by reading out the sector which stores the second error correcting code even if it is uncorrectable by the first error correcting code, but instead only requirement is to read out the alternative sector in the recording-reproduction area which has been assigned in advance, and this minimizes the access time.

In addition, for the sake of preventing an uncorrectable affair solely by the first error correcting code, it becomes unnecessary to sacrifice the recording capacity by appending first error correcting codes too redundantly to all reproduction-only sectors.

Moreover, PWM recording for the data reproduction-only area allows a recording capacity about twice the data recording area, and it becomes possible the satisfactory reproduction of data which has been PWM-recorded with a precisely controlled mastering apparatus and the data recording with a sufficient recording margin through the PPM recording for the data recording area.

BRIEF DESCRIPTION OF THE DRAWINGS

FIG. 1A is a block diagram of the optical disk apparatus of the present invention, FIG. 1B is a diagram showing the arrangement of the optical disk of the optical disk apparatus, FIG. 7 is a diagram explaining the recording pit on the optical disk according to the second embodiment of the invention, FIG. 8 is a sector arrangement diagram of the optical disk for the conventional optical disk apparatus.

DESCRIPTION OF THE PREFERRED EMBODIMENT

The following describes embodiments of this invention with reference to the drawings.

FIG. 1A is a block diagram of the embodiment.

In FIG. 1A indicated by 1 is an optical disk, 2 is an optical head, 3 is a servo circuit and access control circuit for implementing the motor control, focusing control, tracking control and access control. Indicated by 4 is a signal processing circuit, 5 is a first error detecting and correcting circuit, 6 is a second error detecting and correcting circuit, 7 is a microcomputer which control the overall system. Indicated by 8 is an interface circuit and 9 is a RAM.

FIG. 1B is a sector arrangement diagram of the embodiment.

In FIG. 1B, 10 is an optical disk. 11A is a reproduction-only sector area in which data and first error detecting and correcting codes are recorded at manufacturing. 11B is a reproduction-only sector area in which second error correcting codes are recorded. 12 is a recording-reproduction sector area. In this embodiment, each track has one recording-reproduction sector.

Figure 1C:
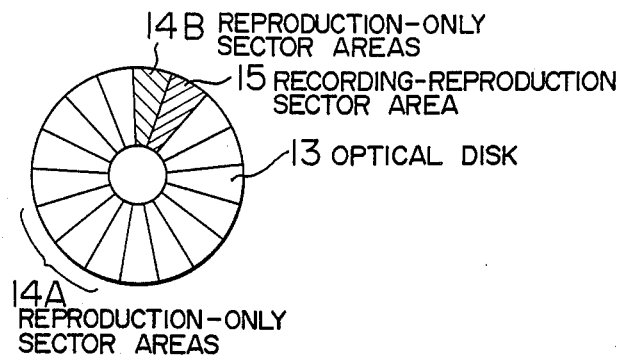
FIG. 1C is a diagram showing the second sector arrangement.

FIG. 1C shows another example of sector arrangement of an embodiment, different from that shown in FIG. 1B.

In FIG. 1C shown by 13 is an optical disk. 14A is a reproduction-only sector area in which are recorded data and first error detecting and correcting codes at manufacturing. 14B is a reproduction-only sector area in which second error correction codes are recorded. 15 is a recording-reproduction sector area. In this example, each track has sectors for recording error correcting codes of one sector and recording-reproduction sectors.

Figure 2:
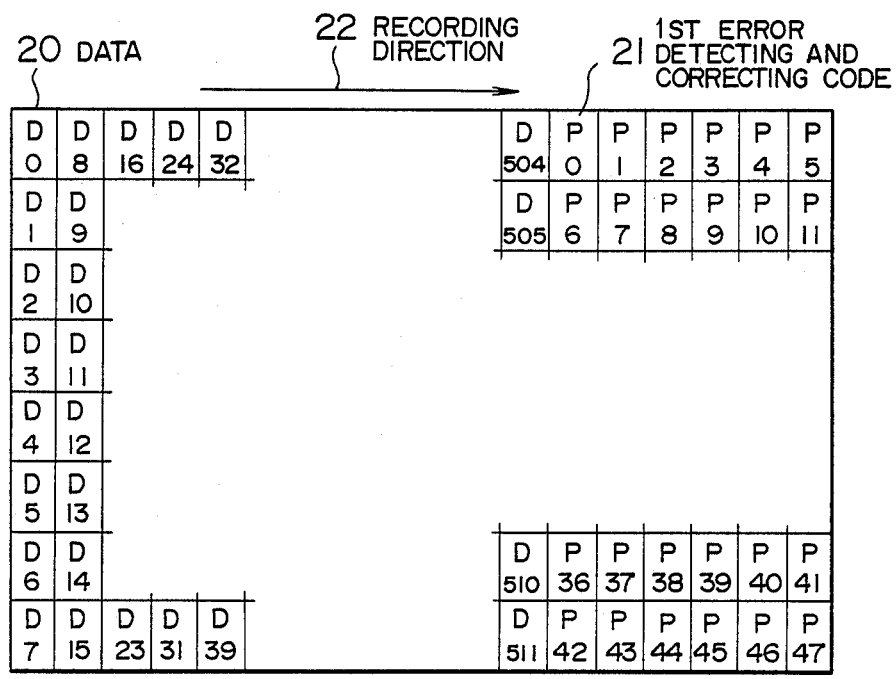
FIG. 2 is a sector formatting diagram showing the first error correcting code.

FIG. 2 is a diagram of recording format within a sector, and it is identical to conventional ones.

Figures 3, 4:
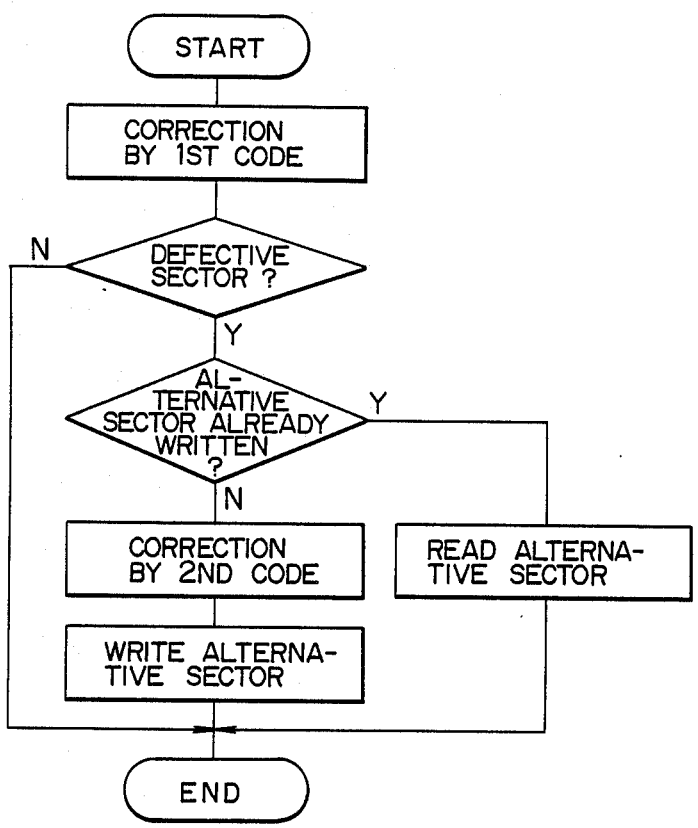
FIG. 3 is an expression for generating the second error correcting code.
FIG. 4 is an operational flowchart according to an embodiment of the invention.

FIG. 3 is the expression for generating second error correcting codes. It is assumed that second error correcting codes are calculated from data in N sectors. In FIG. 3, indicated by 30 is data recorded in recording-reproduction sectors, i.e., second error correcting code, and 31 is data which is the source of the second error correcting code. In the figure, Di, n represents data Dn in sector n. The second error correcting codes are a result of exclusive-OR of data in all sectors.

FIG. 4 is a flowchart showing the operation of this embodiment.

The following describes the operation of this embodiment. Data 20, with the first error correcting codes 21 being generated and appended thereto, are recorded in a sector of the reproduction-only sector area 11A on the optical disk at manufacturing. For data 20 lying over a plurality of sectors or for first error correcting codes 21, second error correcting codes generated by the exclusive-OR operation among data symbols of the same symbol in each sector as shown in FIG. 3 are recorded in a sector of a reproduction-only sector area 11B on the optical disk 10.

For example, when data in one sector is needed, data and first error correcting code within the sector are read through the signal processing circuit 4. In case no disk read error has occurred or if an error is correctable within the ability of the first error correcting code, the first error detecting and correcting circuit 5 will implement the error correction, but in some cases the uncorrectable error occurs. In this case, using the record of the second error correcting code in a sector 11B of another reproduction-only sector area as shown in FIG. 3, the microcomputer 7 makes access to all sectors containing data pertinent to the generation of second error correcting codes and the sector where second error correcting codes are recorded and operates on the second error detecting and correcting circuit 6 to correct the error, and consequently a correct data is obtained basing on the generating expression of FIG. 3.

Suppose a disk having 18,750 tracks and 17 sectors on one track, and all sectors are given sector numbers from 1 to $18,750 \times 17 = 318,750$. When a second error correcting code is appended to a group of 68 sectors in the area 11A and the area 11B begins at track 18,450, then the sector number of the sector where the second error correcting code for an arbitrary sector (sector number Y) is recorded is obtained as:

$$(Y/68) + 18,450 \times 17$$

It is also possible to make the arrangement on the disk of the sector having a record of second error correcting codes as shown in FIG. 1C. In this case, there is one sector with a record of second error correcting codes and one sector capable of recording and reproduction for 15 sectors on each track. Since the sector with a record of second error correcting codes is fixed to a specific sector on the same track, the access address control is simpler than the example of FIG. 1B.

Usually, the probability of failure of the first error correction is very low, and by choosing properly the number of sectors used for generating second error correcting codes 30, the probability of the need of second error correction for sectors within the N sectors can be kept sufficiently low. However, once it becomes uncorrectable, many sectors must be accessed for decoding, and a longer access time will be expended. In order to minimize the access time for an uncorrectable case by the first error correcting code, this method further has the process as shown in FIG. 4 by using a recording-reproduction sector on the same optical disk upon detection of an uncorrectable sector. Namely, at the stage of acquisition of a correct data basing on the generating expression in FIG. 3, the first error detecting and correcting code appended to the data is recorded along with the sector number in error in the recording-reproduction sector area 11 on the same track. The reason for specifying the same track is to reduce the access time. Later on, when the uncorrectable sector is accessed by the same first error correction code, the microcomputer 7 will make a decision to access the recording-reproduction sector on the same track and, if information already corrected by the second error correction code is recorded there, read out the information. Accordingly, the correction time inclusive of the access time is reduced significantly. If the corrected information is not recorded, error correction similar to the previous case will take place using the second error correcting code.

The presence of data corrected by the second error correcting code in the recording-reproduction area can also be judged in such a method, for example, of making a record, with a delete mark being overwritten, in sectors which are uncorrectable by the first error correcting code.

A patent related to the delete mark is patent application No. 58-222405, for example.

Figure 5:
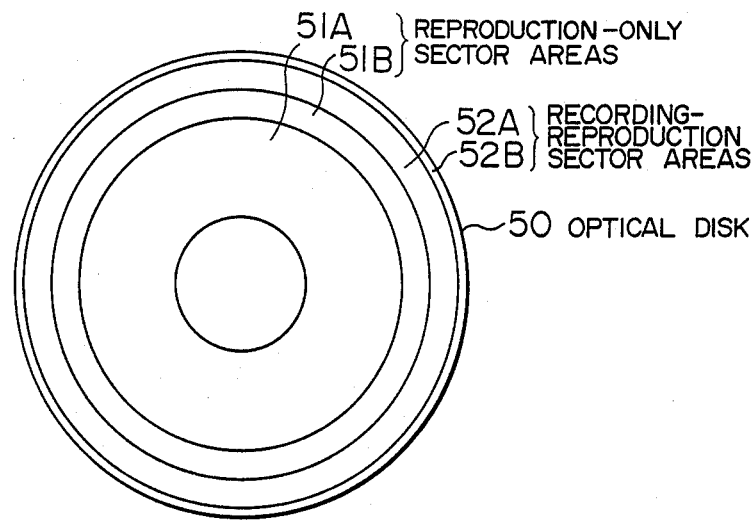
FIG. 5 is a sector arrangement diagram according to the second embodiment of the invention.

The following describes the second embodiment of this invention. FIG. 5 is a sector arrangement diagram of the second embodiment. In FIG. 5, indicated by 50 is an optical disk and 51A is a reproduction-only sector area in which are recorded data and first error correcting codes at manufacturing. 51B is a reproduction only sector area in which second error correcting codes are recorded. 52A is a recording-reproduction sector area in which data are recorded and read out. 52B is a recording-reproduction sector area used for recording and reading out the sector address. The 51A and 51B are recorded in the form of pits in PWM recording mode, while the 52A and 52B are data recording-reproduction sectors capable of recording data in PPM recording mode.

Figure 6:
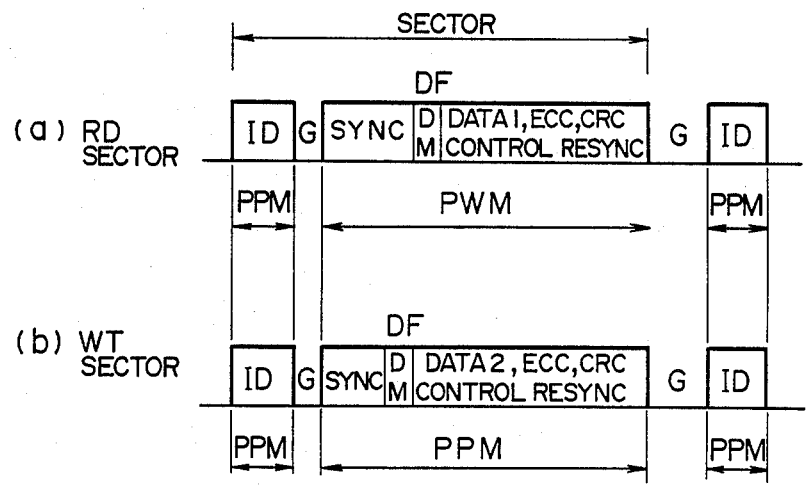
FIG. 6 is a diagram explaining the sector format of the optical disk according to the second embodiment.

FIG. 6 shows an embodiment of the sector format, FIG. 6(a) being the sector format of the data reproduction-only area 51A or 51B, FIG. 6(b) being the format of the data recording area 52A or 52B.

In FIG. 6, indicated by ID is a sector identifier section in which sector address information including the track address and sector address is recorded, DF is a data field section for recording data, and G is a gap for the allowance for jitter at signal recording and reproduction. The data field section DF contains a sync pattern SYNC for clock synchronization at reproduction, data mark DM indicating the head of data, user data DATA1 in the data reproduction-only area, user data DATA2 in the data recording area, first error correcting code ECC, error detecting cyclic code CRC, control data CONTROL for recording address information for the ID section, and recurrent word sync pattern RESYNC for modifying the bit shift in the clock regeneration circuit (PLL circuit). PPM indicates inter-mark record and PWM indicates a mark-length record.

FIG. 7 is a diagram showing recording pits of PPM and PWM modes. In the figure, (a) through (c) are PWM mode and (d) through (f) are PPM mode. (a) and (d) are the same input data, showing the result of (2, 7) RLLC modulation for (b) and (e). Shown by (c) and (f) are pits recorded in PWM mode and PPM mode, respectively.

This embodiment is identical to the first embodiment in that data 20 with first error correcting codes 21 generated and appended thereto are recorded in sectors of the reproduction-only sector area 51A on the optical disk at manufacturing, and for data 20 lying over a plurality of sectors or first error correcting codes 21, second error correcting codes are generated through the exclusive-OR operation among data symbols as shown in FIG. 3 and recorded in the reproduction-only sector area 51B on the optical disk at manufacturing, and that error correction is implemented using the second error correcting code when the first error correction is infeasible. In this embodiment, when it is intended to record information, which has been corrected by the second error correcting code, in the recording-reproduction sector area, the corrected information is recorded in area 52A and information in the corrected sector address is recorded in 52B. By this method, the sector address information 52B is read at the startup of optical disk, and access to this location can be eliminated during the mist of operation.

This embodiment adopts the PWM recording mode for reproduction-only sectors so as to provide an increased recording capacity and the PPM recording mode for recording-reproduction sectors without appendage of second error correcting codes so as to enhance the reliability of user-recorded data.

FIG. 7 shows the case that the minimum pit interval PW for PWM recording and the minimum pit interval PP for PPM recording are virtually equal, indicating that PWM recording has a recording density twice that of PPM.

The disk storage capacity will be calculated by taking an example of a (2, 7) RLLC modulation, 51/4 inch optical disk having a sector size of 1,024B for PPM recording sectors and recording area with $\phi$120–60 mm.

Assuming each section of sector to have a number of bytes as SYNC=12B, DM=3B, DATA2=1,024B, ECC=160B (error correction detection code length 120B, 16 parity, 10 interleave), CONTROL=12B, CRC=4B, RESYNC=59B, ID=50B, and F=40B, the total bytes of sector result 1364B. Assuming the pit interval PP of FIG. 6 to be 1.5 $\mu$m (1 $\mu$m/pit), 17 sectors are included on one track.

Next, for the case of PWM recording, the sector size is 2,048, the ID section is PPM with different data rate, assumption is made for much easiness of clock reproduction, as SYNC=24B, DM=3B, DATA1=2,048B, ECC=160B (error correction detection code length 224B, 16 parity, 10 interleave), CONTROL=28B, CRC=4B, RESYNC=111B, ID=50B, and G=40B.

In consideration of second-order distortion of PWM recording, the pit interval PW is assumed to be 2 $\mu$m and PPM recording for the ID section and gap G, the most inner circumference Di for PWM is calculated as follows.

$$Di = 17 \times ((50 + 40) \times 8 \times 1 \ \mu m + 2{,}378B \times 8 \times \tfrac{3}{8} \ \mu m)/3.14$$
$$= 72.5 \ mm.$$

Accordingly, for a track pitch of 1.6 $\mu$m, the data reproduction-only area has a number of tracks of (120-Di)/(2×1.6 $\mu$m)=14,844 tracks and the recording capacity is $$14{,}844 \times 17 \times 2048B = 516MB.$$

Because of the recording area $\phi$120 mm–$\phi$60 mm, the total number of tracks is 18,750, the data recording area is (18,750−14,844)×17×1,024B=68MB, and the entire optical disk has a recording capacity of 584MB. It means the realization of a capacity greater by 258MB as compared with the case of sole PPM recording which measures 18,750×17×1,024B=326MB.

Although in PWM recording second-order distortion of pits needs to be low enough since information is handled at both edges of pit, this does not matter because the sole data reproduction area is recorded in the well-controlled condition in the factory.

On the other hand, PPM recording for the data recording area is at the center of pit for information handling, and therefore satisfactory data recording is done even under the variation of recording power or disparity of recording sensitivity of the optical disk.

According to this embodiment, as described above, the optical disk has its reproduction-only area recorded in PWM and data recording-reproduction area recorded in PPM, whereby optical disks having reproduction-only areas with a very large recording capacity are made available and satisfactory recording and reproduction is made possible even for optical disks deposited with a recording layer having much second-order distortion in its recording-reproduction characteristics. Since, in general use, the dominant part of an optical disk is allotted to reproduction-only sectors, overhead attributable to PPM recording for recording-reproduction sectors is conceivably small enough and does not matter.

In this invention, the type of code used for error correction is arbitrary, and more than one coding may take place within a sector. The proportion of reproduction-only sector areas to recording-reproduction sector areas and their disposition can be arranged arbitrarily.

As described above, the present invention provides a means of error recovery in virtually a short access time, and provides an optical disk with very large capacity which allows the user to record data freely despite of a reproduction-only optical disk, whereby its practical benefits are great.

We claim:

1. An optical disk apparatus which uses an optical disk having a plurality of sectors, said plurality of sectors consisting of reproduction-only information recording sectors and recording-reproduction sectors, with data and first error correcting codes for said data being recorded in advance in said reproduction-only sectors and second error correcting codes for said data or said data and first error correcting codes over plurality of said data being recorded in different reproduction-only sectors, said optical disk apparatus further including means for reproducing reproduction-only sectors where said data and first error correcting codes or second error correcting codes are recorded; error correcting means; means of implementing error correction for data basing on said second error correcting codes by use of data in a reproduction-only sector if error correction for data by first error correcting codes is infeasible; means of recording corrected data with said first error detecting and correcting code being appended thereto in a recording-reproduction sector; and means which, when reproducting again a sector uncorrectable by said first error correcting codes, reproduces said recorded recording-reproduction sector without using said second error correcting codes.

2. An optical disk apparatus according to claim 1, wherein, if error correction by said first error correcting codes is infeasible, an alternative sector address where data corrected by said second error correcting code is recorded is recorded.

3. An optical disk apparatus according to claim 1, wherein a delete mark is overwritten in a sector which is infeasible of error correction by said first error correcting codes.

4. An optical disk apparatus according to claim 1, wherein said each sector of optical disk consist of a sector identifier section recording address information and a data field section for recording data, and said disk consists of data reproduction-only area with data being recorded in the form pits in an outer circumferential area and a data recording area capable of data recording in an inner circumferential area, said data field section being recorded in PWM mode for said data reproduction-only area and in PPM mode for said data recording area.

5. An optical disk apparatus according to claim 2, wherein said each sector of optical disk consist of a sector identifier section recording address information and a data field section for recording data, and said disk consists of data reproduction-only area with data being recorded in the form pits in an outer circumferential area and a data recording area capable of data recording in an inner circumferential area, said data field section being recorded in PWM mode for said data reproduction-only area and in PPM mode for said data recording area.

6. An optical disk apparatus according to claim 3, wherein said each sector of optical disk consist of a sector identifier section recording address information and a data field section for recording data, and said disk consists of data reproduction-only area with data being recorded in the form pits in an outer circumferential area and a data recording area capable of data recording in an inner circumferential area, said data field section being recorded in PWM mode for said data reproduction-only area and in PPM mode for said data recording area.

7. An optical disk apparatus according to claim 4, wherein said sector identifier section is recorded in PPM mode for both of said data reproduction-only area and said data recording area.

8. An optical disk apparatus according to claim 5, wherein said sector identifier section is recorded in PPM mode for both of said data reproduction-only area and said data recording area.

9. An optical disk apparatus according to claim 6, wherein said sector identifier section is recorded in PPM mode for both of said data reproduction-only area and said data recording area.

10. An optical disk apparatus according to claim 4, wherein said data reproduction-only area and data recording-reproduction area have a same number of sectors, data reproduction-only sectors having a data capacity approximately twice the data capacity of data recording-reproduction sectors.

11. An optical disk apparatus according to claim 5, wherein said data reproduction-only area and data recording-reproduction area have a same number of sectors, data reproduction-only sectors having a data capacity approximately twice the data capacity of data recording-reproduction sectors.

12. An optical disk apparatus according to claim 6, wherein said data reproduction-only area and data recording-reproduction area have a same number of sectors, data reproduction-only sectors having a data capacity approximately twice the data capacity of data recording-reproduction sectors.

13. An optical disk having sectors consisting of information recorded sectors for reproduction-only and recording-reproduction sectors, data and first error correcting codes for said data being recorded in advance in said reproduction-only sectors, second error correcting codes for both said data and first error correcting codes or for only said data being recorded in advance in different reproduction-only sectors.

* * * * *